(12) United States Patent
Hagen

(10) Patent No.: US 9,239,032 B2
(45) Date of Patent: Jan. 19, 2016

(54) FUEL SYSTEM AND METHOD FOR OPERATING A FUEL SYSTEM

(75) Inventor: Harald Hagen, Creussen (DE)

(73) Assignee: AUDI AG, Ingolstadt (DE)

( * ) Notice: Subject to any disclaimer, the term of this patent is extended or adjusted under 35 U.S.C. 154(b) by 653 days.

(21) Appl. No.: 13/328,307

(22) Filed: Dec. 16, 2011

(65) Prior Publication Data

US 2012/0174894 A1    Jul. 12, 2012

(30) Foreign Application Priority Data

Dec. 21, 2010  (DE) .......................... 10 2010 055 310

(51) Int. Cl.

| F02M 63/00 | (2006.01) |
|---|---|
| F02M 25/08 | (2006.01) |
| B60K 15/035 | (2006.01) |
| B60K 15/03 | (2006.01) |

(52) U.S. Cl.
CPC .......... *F02M 25/08* (2013.01); *B60K 15/03504* (2013.01); *B60K 15/03519* (2013.01); *B60K 2015/0319* (2013.01); *B60K 2015/0321* (2013.01); *B60K 2015/03509* (2013.01)

(58) Field of Classification Search
CPC ....... F02M 33/00; F02M 37/20; F02M 63/00; F02D 41/20; F02D 41/22; F02D 23/00; B60K 2015/03; B60K 2015/0319; B60K 2015/0321
USPC ................................. 123/445, 447, 516–520; 73/114.41–114.43, 114.48
See application file for complete search history.

(56) References Cited

U.S. PATENT DOCUMENTS

| 4,552,015 | A | * | 11/1985 | Emmett et al. ............. 73/114.52 |
|---|---|---|---|---|
| 4,658,796 | A | * | 4/1987 | Yoshida et al. ............... 123/519 |
| 5,349,935 | A | * | 9/1994 | Mezger et al. ................ 123/520 |
| 5,357,908 | A | * | 10/1994 | Sung et al. ......................... 123/3 |
| 5,441,031 | A | * | 8/1995 | Kiyomiya et al. ............. 123/518 |
| 5,560,347 | A | * | 10/1996 | Reddy et al. .................. 123/520 |
| 5,794,599 | A | * | 8/1998 | Blumenstock ................ 123/519 |
| 5,890,474 | A | * | 4/1999 | Schnaibel et al. ............ 123/520 |
| 5,957,113 | A | * | 9/1999 | Masaki et al. ................ 123/518 |
| 6,006,596 | A | * | 12/1999 | Blumenstock et al. ..... 73/114.43 |
| 6,253,742 | B1 | * | 7/2001 | Wickman et al. ............. 123/516 |

(Continued)

FOREIGN PATENT DOCUMENTS

| CN | 101900041 A | 12/2010 |
|---|---|---|
| DE | 299 17 910 U1 | 3/2000 |

(Continued)

OTHER PUBLICATIONS

Chinese Search Report issued in counterpart Chinese Patent Application No. 2011104632473 on Jun. 30, 2015.

(Continued)

*Primary Examiner* — John Kwon
*Assistant Examiner* — Johnny H Hoang
(74) *Attorney, Agent, or Firm* — Henry M. Feiereisen LLC

(57) ABSTRACT

A fuel system, in particular of a motor vehicle, with a fuel tank and a ventilation device for ventilating the fuel tank, wherein the ventilation device has at least one separation device which has a temporary accumulator for liquid fuel. The separation device has a fill level determination device for determining the fill level of in the temporary accumulator. The invention further relates to a method for operating a fuel system.

17 Claims, 1 Drawing Sheet

(56) References Cited

U.S. PATENT DOCUMENTS

| | | | |
|---|---|---|---|
| 6,435,164 B1* | 8/2002 | Kaiser et al. | 123/516 |
| 6,581,578 B2* | 6/2003 | Reiter | 123/516 |
| 6,634,342 B1* | 10/2003 | Wouters et al. | 123/516 |
| 7,694,665 B2* | 4/2010 | Ehrman et al. | 123/518 |
| 7,775,195 B2* | 8/2010 | Schondorf et al. | 123/520 |
| 8,844,754 B2* | 9/2014 | Pozgainer et al. | 220/562 |
| 2002/0088439 A1* | 7/2002 | Distelhoff et al. | 123/516 |
| 2002/0157715 A1* | 10/2002 | Viebahn | 137/588 |
| 2003/0230288 A1* | 12/2003 | King et al. | 123/516 |
| 2006/0162705 A1* | 7/2006 | Grunwald et al. | 123/520 |
| 2006/0225709 A1* | 10/2006 | Washeleski et al. | 123/478 |
| 2008/0121217 A1* | 5/2008 | Guterres et al. | 123/516 |
| 2008/0196482 A1* | 8/2008 | Schelhas et al. | 73/49.2 |
| 2010/0031932 A1* | 2/2010 | Mai et al. | 123/520 |
| 2010/0101541 A1* | 4/2010 | Grunwald et al. | 123/518 |
| 2010/0223975 A1* | 9/2010 | Lueck et al. | 73/1.06 |
| 2010/0300405 A1* | 12/2010 | Uhrich et al. | 123/435 |
| 2011/0100329 A1* | 5/2011 | Li | 123/445 |

FOREIGN PATENT DOCUMENTS

| | | |
|---|---|---|
| DE | 199 32 713 A1 | 1/2001 |
| DE | 199 54 541 A1 | 5/2001 |
| DE | 100 52 399 A1 | 5/2002 |
| DE | 100 60 239 | 6/2002 |
| DE | 102005043888 | 3/2007 |
| EP | 1132246 A2 | 9/2001 |
| WO | WO2007/031466 | 3/2007 |
| WO | WO 2010/122065 | 10/2010 |

OTHER PUBLICATIONS

English translation of Chinese Search Report issued in counterpart Chinese Patent Application No. 2011104632473 on Jun. 30, 2015.

* cited by examiner

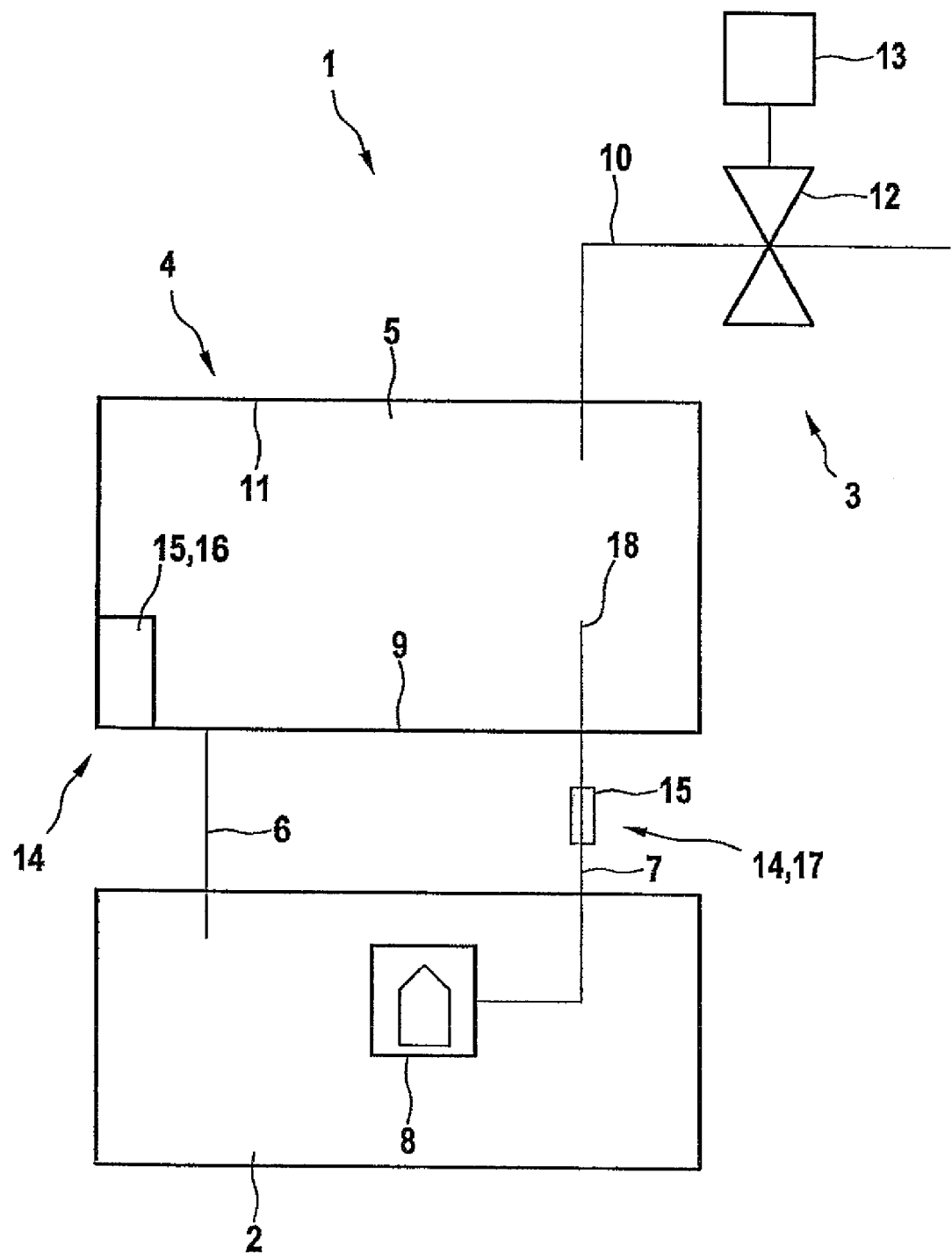

FUEL SYSTEM AND METHOD FOR OPERATING A FUEL SYSTEM

CROSS-REFERENCES TO RELATED APPLICATIONS

This claims the priority of German Patent Application, Serial No. 10 2010 055 310.7, filed Dec. 21, 2010, pursuant to 35 U.S.C. 119(a)-(d).

BACKGROUND OF THE INVENTION

The invention relates to a fuel system in particular of a motor vehicle with a fuel tank and a ventilation device for ventilating the fuel tank, wherein the ventilation device has a separation device which has at least one temporary accumulator for liquid fuel. The invention further relates to a method for operating a fuel system.

Fuel systems of the aforementioned type are known from the state of the art. They are assigned for example to a motor vehicle or a drive system of the motor vehicle. The drive system includes in particular at least one internal combustion engine and is for example configured as hybrid drive system, i.e. it includes the internal combustion engine as well as at least one electrical machine, wherein the internal combustion engine and the electrical machine at least temporarily concertedly generate a drive torque of the drive system. The internal combustion engine is supplied with fuel from the fuel tank by the fuel system. Oftentimes, a volatile hydrocarbon fuel, for example gasoline, is used as fuel. The fuel tank therefore normally contains a volume of liquid fuel as well as a volume of gaseous fuel, which accumulates in particular above the liquid fuel. The fuel tank can be a closed tank in particular a pressure tank, or a partially closed, in particular also pressure free tank. The closed tank is used in particular for reducing emissions.

Due to temperature fluctuations of the fuel, for example caused by changes of the ambient temperature, pressure fluctuations can occur in the fuel tank. For this reason, the ventilation device is assigned to the fuel tank. It serves for ventilating the fuel tank. In this way, excessive pressure in the fuel tank can be reduced by the ventilating device. For this purpose the ventilation device ventilates the fuel tank for example by a ventilation line. During ventilation, gaseous as well as liquid fuel can exit the fuel tank through the ventilation device or the ventilation line. The ventilated fuel thus is first present as a mixture of gaseous and liquid fuel. This is particularly the case when the fuel tank is ventilated at a high pressure inside the fuel tank. As a result of the high pressure or the great pressure difference between the pressure inside the fuel tank and the pressure outside of the fuel tank, the ventilated fuel has high flow velocities, which causes liquid fuel to be carried along by the gaseous fuel.

The gaseous fuel can readily be fed to the internal combustion engine or its intake system respectively, wherein a fuel accumulator which is preferably configured as activated carbon filter can be provided between the fuel tank and the internal combustion engine. The fuel accumulator serves for temporarily storing gaseous fuel, i.e. for taking up gaseous fuel when unused gaseous fuel is present and for giving off gaseous fuel as soon as the gaseous fuel can be discharged into the internal combustion engine. However, liquid fuel must not enter the fuel accumulator or the internal combustion engine.

For this reason, the ventilation device has the at least one separation device which serves for separating gaseous and liquid fuel. The separation device thus has the purpose to prevent the transfer of liquid fuel from the fuel tank through the ventilation device into the internal combustion engine. The separation device separates liquid fuel and allows gaseous fuel to pass. The separated liquid fuel enters the temporary accumulator of the separation device. The term temporary accumulator does not mean that a (temporary) accumulation of the liquid fuel is indeed provided for. Rather, the liquid fuel can be discharged directly from the temporary accumulator or the separation device preferably in the direction of the fuel tank. Here, however, a rise of the fill level of the temporary accumulator may result, for example due a limitation of the discharge volume flow, in particular by a line cross section or the like. The separated liquid fuel thus temporarily cannot be discharged at the same rate as it enters the temporary accumulator. Of course, a temporary storage of the liquid fuel, for example over a defined period of time can also be realized.

When operating the fuel system, the amount of liquid fuel present in the temporary accumulator or the separation device should be prevented from exceeding a threshold amount, i.e. from being greater than the fill level of the temporary accumulator, because this may impair the effectiveness of the separation device. The greater the amount of liquid fuel in the temporary accumulator, the greater is the risk that liquid fuel also escapes the separation device together with the gaseous fuel and is carried along in the direction of the fuel accumulator or the internal combustion engine. For this reason, the fuel delivery device can be assigned to the separation device. The former is used to deliver liquid fuel out of the temporary accumulator, in particular in the direction of the fuel tank. The fuel delivery device is usually configured as ejector pump wherein fuel which is delivered by a fuel pump of the fuel system out of the fuel tank in the direction of internal combustion engine, is often used as means for driving the ejector pump. In fuel systems known from the state of the art it may happen, however, that liquid fuel escapes the separation device again together with the gaseous fuel and is carried along in the direction of the fuel accumulator of the internal combustion engine.

SUMMARY OF THE INVENTION

Therefore, it is the object of the invention to propose a fuel system with which a reliable operation can be ensured in particular also in the case when a great volume flow (amount per time unit, alternatively: mass flow) in particular liquid fuel from the fuel tank enters the separation device.

According to the invention, this is attained in that the separation device has a fill level determination device for determining the fill level in the temporary accumulator. The amount of liquid fuel in the temporary accumulator can be determined by means of the fill level determination device. A mode of operation of the fuel system or at least of a further device of the drive system of the motor vehicle can be selected in particular from a plurality of modes of operation, in dependence on the fill level. For example, in case of a defined first fill level, the mode of operation of the fuel system is selected such that the ventilation device allows a defined first volume flow or mass flow, respectively, while in case of a second greater fill level another mode of operation is selected, in which the ventilation device only allows a second, smaller volume flow or mass flow, respectively. This prevents that in case of a large amount of liquid fuel in the temporary accumulator, the volume flow or mass flow of gaseous fuel, respectively, which flows through the ventilation device, is so great that a portion of the liquid fuel is carried along by the gaseous fuel. In this way in particular the fuel accumulator is protected from liquid fuel.

In a refinement of the invention, the fill level determination device includes at least one mechanical and/or electrical fill level sensor. The fill level sensor serves for determining the fill level in the temporary accumulator, in particular a local fill level in the region of the fill level sensor, from which the fill level can be determined. The use of multiple fill level sensors can allow a more accurate determination of the fill level in the temporary accumulator, in particular when the fill level sensors are arranged spaced apart from one another. The fill level sensor can from example be base on a mechanical or an electrical operating principle. The mechanical fill level sensor has for example a float, which has a lower density than the liquid fuel, so that it is urged upwards by the fuel. The position of the float thus allows drawing conclusions about the fill level.

In a refinement of the invention, the fill level sensor is a capacitive inductive or resistive sensor. In the capacitive sensor the electric capacitance between two or more electrodes is determined. A space between the electrodes is in flow communication with the temporary accumulator so that liquid fuel can enter the space. The capacitance of the sensor changes when the fill level in the temporary accumulator and with this the space changes because the dielectricity between the electrodes changes. In the inductive sensor the fill level is determined corresponding to a change of the inductivity—for example as a result of a change in pressure, when the sensor is arranged on the bottom of the temporary accumulator—and in the resistive sensor corresponding to the resistance between the electrodes of the sensor.

In a refinement of the invention, the fill level sensor is a radar sensor a microwave sensor, an optical sensor or a fluid sensor. The radar sensor operates for examples with radar impulses which are emitted by an antenna and are reflected by a surface of the fuel in the temporary accumulator. The runtimes of one or more of the radar impulses conclusions allow drawing conclusions about the fill level in the temporary accumulator. The radar is therefore preferably arranged on a bottom or a ceiling of the temporary accumulator. In the microwave sensor a sender and a receiver are usually arranged in the temporary accumulator so that they confront one another, wherein for example the sender is arranged at the bottom and the receiver at the ceiling or vice versa. The sender sends microwave impulses which are received by the receiver. Because the liquid fuel in the temporary accumulator absorbs the microwaves more than the gaseous fuel, the intensity of the received microwave impulses allows drawing conclusions about the fill level of the temporary accumulator. The optical sensor allows detecting an absorption of light or a disappearance of the total reflection and from this to draw conclusions about the fill level in the temporary accumulator. With the fluid sensor it can be determined whether the latter is surrounded by liquid fuel or by gaseous fuel. The fluid sensor is for example arranged in a ventilation line between the fuel tank and the temporary accumulator, however outside the temporary accumulator or the separation device respectively. If it is determined by means of the fluid sensor that the latter is surrounded by or in contact with the liquid fuel conclusions about a certain fill level in the temporary accumulator can be drawn.

In a refinement of the invention at least one ventilation valve is fluidly arranged upstream or downstream of the separation device for ventilating the fuel tank by the separation device. The ventilation valve is assigned to the ventilation device. The ventilation valve can be adjusted so that it opens for the ventilation of the fuel tank and closes for ending the ventilation. It is for example a FTIV (Fuel Tank Isolation Valve). The ventilation valve can be configured as timing valve which allows setting discrete switching conditions (open and closed). Particularly preferably, the ventilation valve is configured as proportional valve, which does not merely allow the discrete switching states but allows setting the flow through cross section in multiple stages, preferably a continuous setting. In this way, the volume flow through the separation device can be set in particular continuously, controlled and/or regulated. The ventilation valve is fluidly connected to the separation device upstream or downstream of the latter, the fuel thus always has to also pass the ventilation valve for flowing through the separation device. The ventilation valve can be integrated in the separation device or the fuel delivery device. The ventilation valve can thus be integrated into the fuel delivery device in a modular fashion.

In a refinement of the invention, the fill level determination device and/or a control device which is assigned to the fill level determination device are configured to operate the ventilation valve, an overflow valve and/or at least one fuel delivery device, in particular an ejector pump in dependence on the fill level of the temporary accumulator through open-loop or closed-loop control. As described before, the ventilation valve can be operated such that in case of a first fill level of the temporary accumulator a first volume flow and in case of a second higher fill level a second smaller volume flow through the ventilation device or the separation device, respectively, is adjusted by means of the ventilation valve. For this purpose, the ventilation valve is operated by the fill level determination device or the control device, respectively. The fuel delivery device serves for example for delivering fuel out of the temporary accumulator in the direction of the fuel tank. For this purpose it can be constructed as ejector pump. As an alternative, the fuel delivery device can be configured as fuel delivery means which serves for delivering fuel out of the fuel system for example in the direction of the internal combustion engine. Such a fuel delivery means is in particular constructed as fuel pump. The overflow valve can also be operated in accordance with the above elaborations, via which overflow valve a flow communication between an outlet of the fuel deliver unit with which fuel can be delivered out of the fuel system, and the fuel tank. The overflow valve thus allows conducting fuel which has already been delivered by means of the fuel delivery means, back again into the fuel tank. This serves in particular for adjusting the pressure inside the tank.

In a refinement of the invention, a ventilation valve which switches in dependence on the fill level of the fuel tank and/or at least one safety valve which is assigned to the fuel tank are fluidly arranged upstream of the separation device. The ventilation valve is in particular configured as FLVV (Fill Limit Venting Valve). The latter allows ventilating the fuel tank so long as the fuel tank fill level is smaller than a defined fuel fill level, in particular a maximal fuel tank fill level. Ventilation of the fuel tank is thus ensured via the ventilation valve, in particular when fuel is added to the fuel tank. In addition or as alternative, the safety valve can be provided which is configured for example as ROV (Roll Over Valve). The ventilation valve as well as the safety valve is usually assigned to the fuel tank and fluidly arranged upstream of the separation device, so that the fuel first passes through the ventilation valve or the safety valve, respectively, before entering the separation device.

The invention further relates to a method for operating a fuel system, in particular in accordance with the above elaborations, wherein the fuel system has a fuel tank and a ventilation device for ventilating the fuel tank and the ventilation device has at least one separation device which has a temporary accumulator for liquid fuel. The fill level in the temporary accumulator is determined by means of a fill level determination device which is assigned to the separation device. The fuel system can be refined according to the above elaborations, so that insofar reference is made to the latter.

In a refinement of the invention the ventilation valve an overflow valve and/or at least one fuel delivery device, in particular an ejector pump are operated in a controlled and/or regulated manner in dependence on the fill level of the temporary accumulator. Again reference is made to the elaborations above.

In a refinement of the invention the ventilation valve is operated in a first operating mode when the fill level of the temporary accumulator is below a defined threshold fill level and is operated in a second operating mode above the threshold fill level, wherein a volume flow which flows through the ventilation valve is selected smaller than in the second operating mode than in the first operating mode and/or the ventilation valve is opened slower than in the first operating mode. As already explained above, the operating mode is selected from multiple operating modes according to the fill level of the temporary accumulator. Here, the first operating mode is selected when a fill level is below the threshold fill level and the second operating mode is selected when a fill level is above or equal to the threshold fill level. When ventilating the fuel tank by means of the ventilation device, the volume flow is set smaller in the second operating mode than in the first operating mode by opening the ventilation valve only partially. When the ventilation valve is open the volume flow is thus smaller in the second operating mode than in the first operating mode.

In addition or as an alternative, the ventilation valve can be operated so that it opens slower in the second operating mode than in the first operating mode. A slower opening of the ventilation valve prevents liquid fuel from being carried along by the gaseous fuel out of the temporary accumulator, by decreasing the pressure inside the fuel tank more slowly at the beginning of the opening than in case of the fast opening. If the fill level is smaller than the defined threshold fill level such safety measures are not necessary so that the fuel tank can be ventilated with the maximal volume flow and the ventilation valve may be opened fast.

The invention also relates to a drive system with a fuel system according to the elaborations above, which is or can be operated in particular according to the method described above. The drive system has in particular at least one internal combustion engine and is configured for example as hybrid drive system.

BRIEF DESCRIPTION OF THE DRAWING

In the following, the invention is explained in more detail by way of the exemplary embodiments shown in the drawing, without limiting the invention. It is shown in the single
FIGURE a schematic view of a motor vehicle.

DETAILED DESCRIPTION OF PREFERRED EMBODIMENTS

The FIGURE shows a schematic representation of a fuel system 1. The fuel system 1 is for example part of a motor vehicle or a drive system of the motor vehicle. The fuel system 1 has a fuel tank 2 and a ventilation device 3 for ventilating the fuel tank 2. The ventilation device 3 has a separation device 4 with a temporary accumulator 5. The separation device 4 serves for separating liquid fuel from a mixture of liquid and gaseous fuel. The separated liquid fuel is subsequently present in the temporary accumulator 5, and can for example be conducted back again into the fuel tank 2 through a return line 6. The return line 6 has preferably a valve, in particular a drainage valve or a check valve. Instead of the return line 6 only the valve can also be provided in particular when the separation device 4 is located at least in part in the fuel tank 2, so that fuel which escapes from the temporary accumulator 5 directly enters the fuel tank 2 though the valve. The valve is configured so that fuel can only leave the temporary accumulator through the return line 6, but cannot enter it. This prevents fuel in the fuel tank from entering the temporary accumulator through the return line 6.

The ventilation device 3 is in flow communication with the fuel tank 2 via a ventilation line 7. On the side of the ventilation line 7 which faces the fuel tank 2, or in the fuel tank 2, respectively an aeration valve 8 is provided which switches in dependence on the fuel fill level. Usually, the aeration valve 8 is configured so that it is only open in case of a fuel fill level which is below a defined fuel fill level, in particular a maximal fuel fill level, i.e. fuel in the fuel tank can enter the ventilation line 7. The ventilation line 7 leads into the temporary accumulator 5 of the separation device 4, preferably through a bottom 9 of the temporary accumulator 5. At a distance to the ventilation line 7 or the site of entry of the latter into the temporary accumulator 5 an outlet line 10 leads into the temporary accumulator 5, preferably through a ceiling 11 of the temporary accumulator 5. Thus, the site of entry of the outlet line 10 into the temporary accumulator 5 is preferably arranged so that only gaseous fuel in the temporary accumulator 5 can enter the outlet line 10. For this, the sites of entry of the outlet line 10 and the ventilation line 7 are preferably arranged at confronting sides of the temporary accumulator 5. The outlet line 10 has a ventilation valve 12 which is actuatable by means of an actuation device 13. The ventilation valve 12 and the actuation device are configured so that the flow through cross section of the ventilation valve 12 is adjustable in a continuous manner.

The separation device 4 is usually located at least in part in particular in its entirety in the fuel tank 2. However, an arrangement outside the fuel tank 2 is also possible. As an alternative, the separation device 4 can also be integrated in a line, for example the ventilation line 7. In a preferred embodiment, the separation device is configured so that it or the ventilation device 3 has a defined pressure loss. The latter is selected so that when ventilating the fuel tank 2 by means of the ventilation device 3, a valve which may be present, for example the ventilation valve 8, is not brought into its closed position. The ventilation valve 8 usually has a float which does not cover a valve seat of the ventilation valve 8 so long as the fuel tank fill level is smaller than a defined fuel tank fill level. When the volume flow which is discharged by means of the ventilation device 3, i.e. the ventilation valve 8, is greater than a design volume flow, the float can be displaced into the valve seat, i.e. the closed position, by the volume flow or the ventilated fuel, so that a further ventilation of the fuel tank 2 is not possible. This applies in particular when the ventilation valve 12 is completely open.

Usually, the pressure loss of the ventilation device 3 is set by adjusting the ventilation valve 12, for example by introducing a throttle element. In this case, the pressure loss of the ventilation device 3 preferably takes place by adjusting the separation device or the pressure loss respectively, of the latter for example by providing an adjusted throttle element. Preferably, the ventilation valve 12 has no throttle element. However, the throttle element can of course be provided additionally.

For determining the fill level in the temporary accumulator 5 the separation device 4 has a fill level determination device 14. The fill level determination device has at least one fill level sensor 15. The exemplary embodiment shown in the FIGURE, has two fill level sensors 15, wherein one of the fill level sensors 15 is a capacitive sensor 16 and a further fill level sensor is a fluid sensor 17. Instead of the capacitive sensor 16, for example a radar sensor, a microwave sensor or an optical sensor can be provided. The capacitive sensor 16 has at least two electrodes (not shown), having a space there between which is in flow communication with the temporary accumulator 5. The electrodes are arranged in such a manner that the space can be filled with liquid fuel in dependence on the fill level of the temporary accumulator 5. This means that the higher the fill level in the temporary accumulator 5, the more completely the space is filled. This causes a change of the dielectricity between the electrodes which causes a change of the capacitance. Determining the capacitance between the electrodes thus allows drawing conclusions about the fill level in the temporary accumulator 5.

The fill level sensor 17 is at least in some areas for example configured as an electrically conductive foil. It serves for determining whether liquid or gaseous fuel is present in the ventilation line 7. Preferably, an at least approximate determination of the proportion of liquid fuel of the mixture of gaseous and liquid fuel in the ventilation line 7 is possible. Because the ventilation line 7 traverses the bottom 9 of the temporary accumulator 5 and projects into the temporary accumulator 5 by a certain distance, conclusions can be drawn with regard to the fill level in the temporary accumulator 5 when mainly liquid fuel is present in the region of the fluid sensor 17, at which the temporary accumulator 5 is filled to a height which corresponds to the distance. Thus, an entry site 18 of the ventilation line 7 into the temporary accumulator 5 is surrounded by liquid fuel.

The separation device 4 serves for separating liquid fuel which enters the separation device 4 from the fuel tank 2 through the ventilation line 7 from the mixture of gaseous fuel and liquid fuel and preferably feeding the liquid fuel back into the fuel tank 2, in particular through the return line 6. The return line 6 is preferably arranged so that by the influence of gravity, the liquid fuel is urged out of the temporary accumulator 5 in the direction of the fuel tank 2. However, the function of the separation device 4 can only be ensured, when the fill level of the temporary accumulator 5 is below a defined threshold fill level. If the fill level exceeds this threshold fill level, liquid fuel may be carried along by gaseous fuel from the temporary accumulator 5 into the outlet line 10 through which it may be conducted in the direction of the internal combustion engine or a fuel accumulator, in particular an activated carbon filter. This however is undesired because liquid fuel can in particular damage the activated carbon filter or lead to a reduction of its accumulation capacity.

For this reason, the fill level determination device 14 or a control device which is assigned to the fill level determination device 14 is configured to operate the ventilation valve 12 and/or further devices of the fuel system 1 in dependence on the fill level of the temporary accumulator 5 through closed-loop open-loop control, respectively. In particular the ventilation valve 12 is to be operated in a first operating mode when the fill level of the temporary accumulator is below a defined threshold fill level and in a second operating mode above the threshold level. Preferably, a volume flow which flows through the (open) ventilation valve 12 is chosen to be smaller than in the first operating mode. As an alternative, or in addition, the ventilation valve can open more slowly in the second operating mode than in the first operating mode. In this way, liquid fuel is prevented from entering the outlet line 10.

In addition or as an alternative, the fill level determining device 14 or the control device respectively, can be configured to operate an overflow valve which is not shown here, and/or a fuel delivery device which is also not shown, in dependence on the fill level. The overflow valve serves for adjusting a fuel tank pressure of the fuel tank 12. The fuel delivery device is intended to deliver liquid fuel out of the separation device 4 in the direction of the fuel tank 2. For this purpose, the fuel delivery device is configured for example as ejector pump. In addition or as an alternative, the fuel delivery device can also be a fuel pump which serves for delivering fuel out of the fuel tank 2 in the direction of the internal combustion engine. The capacity of the fuel pump can be increased as soon as the fill level of the temporary accumulator 5 exceeds the defined threshold fill level. In particular the volume flow of the fuel which leaves the fuel tank 2 through the ventilation line 7 or outgases can also be determined by means of the fuel level determination device 14. For this purpose, it is advantageous when the ventilation valve is closed during the determination.

What is claimed is:

1. A fuel system comprising
a fuel tank;
a ventilation device for ventilating the fuel tank, said ventilation device including at least one separation device which includes a temporary accumulator and a fill level determination device for determining a fill level of liquid fuel in the temporary accumulator; and
a ventilation valve, said fill level determination device operatively connected to the ventilation valve and operating the ventilation valve in a first mode when the fill level of liquid fuel in the temporary accumulator is below a defined threshold fill level and operating the ventilation valve in a second mode when the fill level of liquid fuel in the temporary accumulator is above a defined threshold fill level.

2. The fuel system of claim 1 for use in a motor vehicle.

3. The fuel system of claim 1, wherein the fill level determination device comprises a fill level sensor said fill level sensor operating mechanically and/or electrically.

4. The fuel system of claim 3, wherein the fill level sensor is a member selected from the group consisting of a capacitive sensor, an inductive sensor, a resistive sensor, a radar sensor, a microwave sensor, an optical sensor and a fluid sensor.

5. The fuel system of claim 1, wherein the ventilation valve is fluidly arranged upstream of the separation device, for ventilating the fuel tank through the separation device.

6. The fuel system of claim 5, further comprising a control device which is assigned to the fill level determination device, a fuel delivery device and an overflow valve, wherein at least one of the fill level determination device and the control device are configured to operate at least one member selected from the group consisting of the ventilation valve, the overflow valve, and the fuel delivery device, in dependence on the fill level in the temporary accumulator through open-looped and/or closed-looped control.

7. The fuel system of claim 6, wherein the fuel delivery device is constructed as an ejector pump.

8. The fuel system of claim 1, further comprising at least one member selected from the group consisting of an aeration valve which switches in dependence on a fill level of the fuel tank and a safety valve which is assigned to the fuel tank, said member being fluidly arranged upstream of the separation device.

9. The fuel system of claim 1, wherein in the first mode a volume flow which flows through the ventilation valve is smaller in the second operating mode than in the first operating mode.

10. The fuel system of claim 9, wherein in the second operating mode the ventilation valve opens slower than in the first operating mode.

11. A method for operating a fuel system, comprising:
determining a fill level in a temporary accumulator for liquid fuel by using a fill level determination device for determining a fill level of liquid fuel in the temporary accumulator, wherein the fuel system comprises a fuel tank and a ventilation device for ventilating the fuel tank, said ventilation device including at least one separation device, said separation device including the temporary accumulator, wherein said fill level determination device is assigned to the at least one separation device; and
with the fill level determination device operating a ventilation valve of the fuel system in a first mode when the fill level of liquid fuel in the temporary accumulator is below a defined threshold fill level, and operating the ventilation valve in a second mode when the fill level of liquid fuel in the temporary accumulator is above a defined threshold fill level.

12. The method of claim 11, wherein the fill level determination device comprises a fill level sensor said fill level sensor operating mechanically and/or electrically.

13. The method of claim 12, wherein the fill level sensor is a member selected from the group consisting of a capacitive sensor, an inductive sensor, a resistive sensor, a radar sensor, a microwave sensor, an optical sensor and a fluid sensor.

14. The method of claim 11, wherein the ventilation valve is fluidly arranged upstream of the separation device, for ventilating the fuel tank through the separation device.

15. The method of claim 11, wherein the fuel system further comprises at least one member selected from the group consisting of a ventilation valve, an overflow valve and a fuel delivery device, wherein the member is operated in dependence on the fill level in the temporary accumulator through open-looped and/or closed-looped control.

16. The method of claim 15, wherein the fuel delivery device is constructed as an ejector pump.

17. The method of claim 11, further comprising operating the ventilation valve in a first operating mode when the fill level in the temporary accumulator is below a defined threshold fill level or in a second operating mode when the fill level is above the threshold fill level, wherein a volume flow which flows through the ventilation valve is selected smaller in the first operating mode than in the first operating mode and/or the ventilation valve is opened more slowly in the second operating mode than in the first operating mode.

* * * * *